United States Patent [19]

Greenwald

[11] 4,453,723
[45] Jun. 12, 1984

[54] SEAL

[75] Inventor: Fred A. Greenwald, Battleground, Wash.

[73] Assignee: General Connectors Corp., Burbank, Calif.

[21] Appl. No.: 385,333

[22] Filed: Jun. 4, 1982

Related U.S. Application Data

[63] Continuation-in-part of Ser. No. 212,028, Dec. 2, 1980, abandoned, which is a continuation-in-part of Ser. No. 181,411, Aug. 26, 1980, abandoned.

[51] Int. Cl.³ .............................................. F16J 15/32
[52] U.S. Cl. .................................... 277/164; 277/165; 277/229
[58] Field of Search ............... 277/229, 163, 164, 165, 277/235 A

[56] References Cited

U.S. PATENT DOCUMENTS

| | | | |
|---|---|---|---|
| 3,464,707 | 9/1969 | Packard et al. | 277/164 |
| 3,603,602 | 9/1971 | Padula | 277/164 |
| 3,813,105 | 5/1974 | McQueen | 277/164 |
| 4,141,563 | 2/1979 | Wu | 277/164 |

Primary Examiner—Robert I. Smith
Attorney, Agent, or Firm—Julius L. Rubinstein

[57] ABSTRACT

A ring shaped seal is formed from an elastomeric material and is generally circular in cross-section. The material is covered in part with an elastomeric impregnated fabric secured thereon which serves as a work contacting surface for making a sealing engagement with a surface on a duct. A tubular ring shaped insert formed from an elastomer is embedded in the seal. A ring shaped spring is movably mounted in the bore of the tubular insert in such a way that the spring is not bonded to and does not adhere to the walls of the tubular insert. The insert is mounted in the seal so the walls of the tubular insert are between the spring and the elastomer impregnated fabric to hold the spring away from the fabric to prolong the life of the seal. The spring is sized so when the seal is mounted on the duct the spring can move in the bore of the tubular insert and exert a compressive force on the seal to compensate the seal for the decreasing resilience of the elastomeric material forming the seal.

3 Claims, 19 Drawing Figures

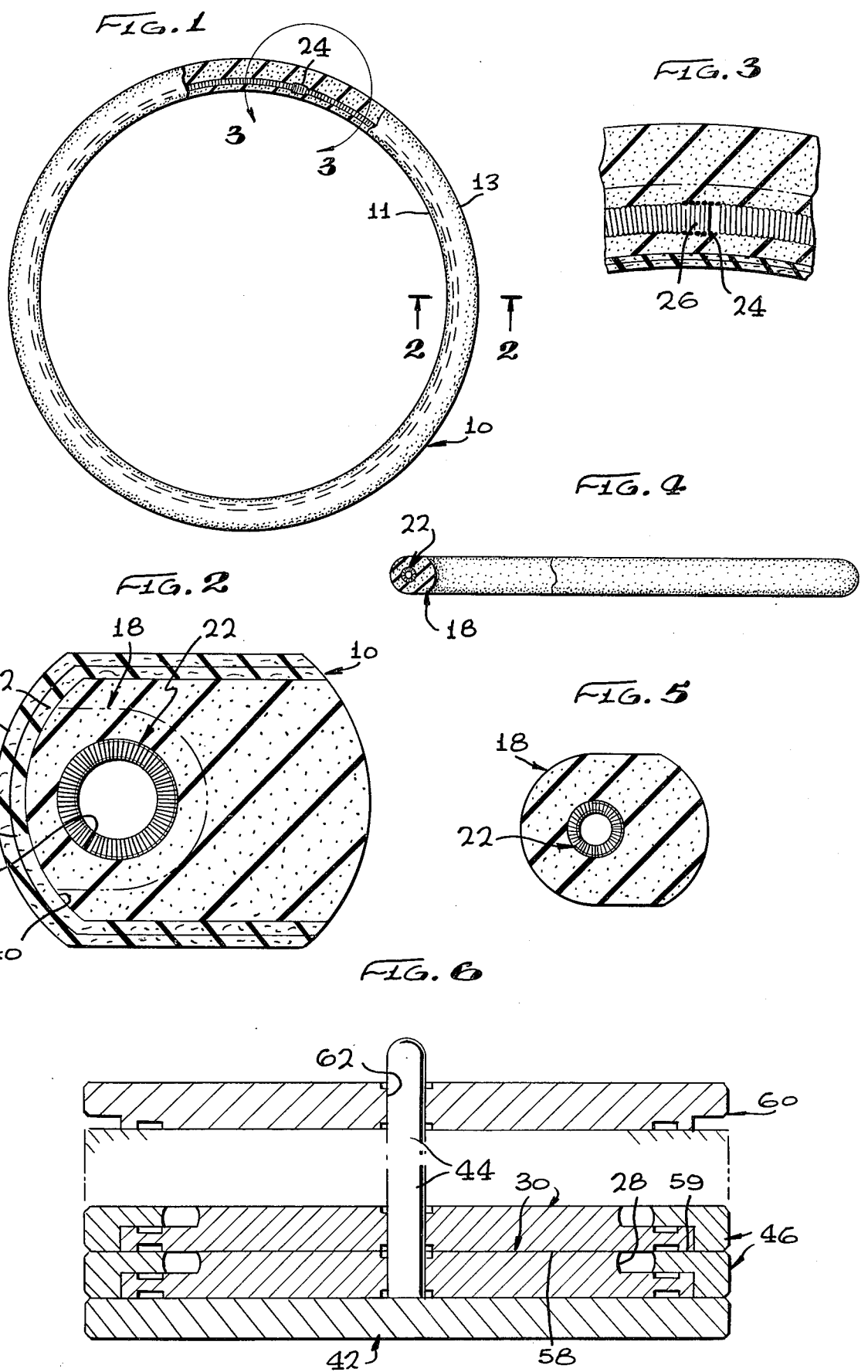

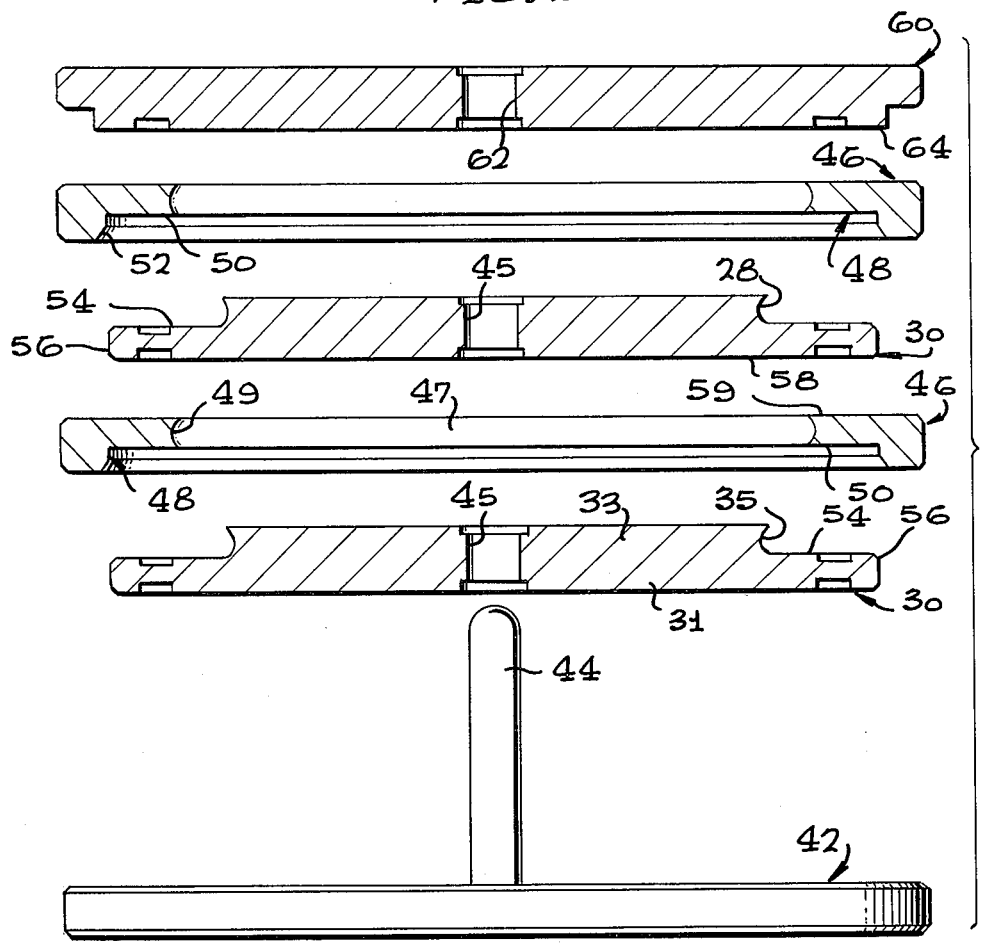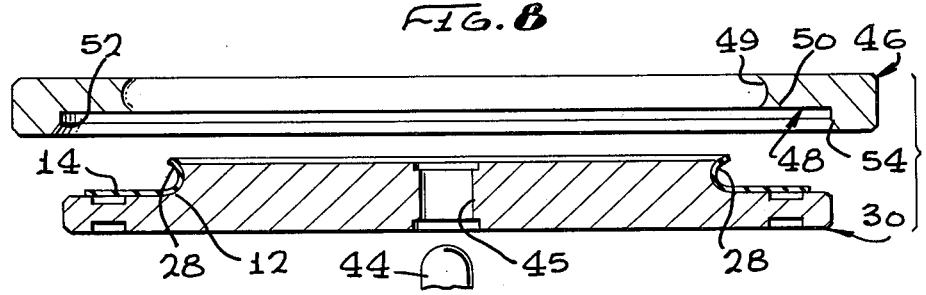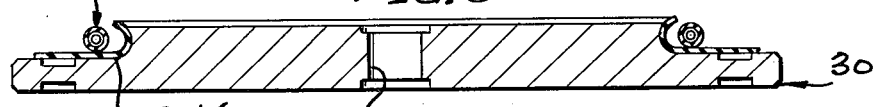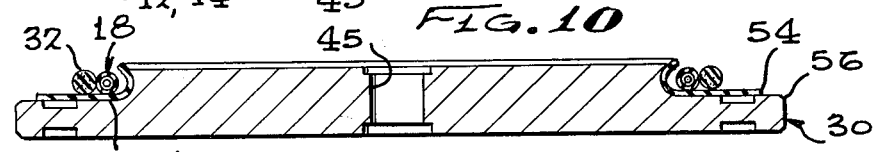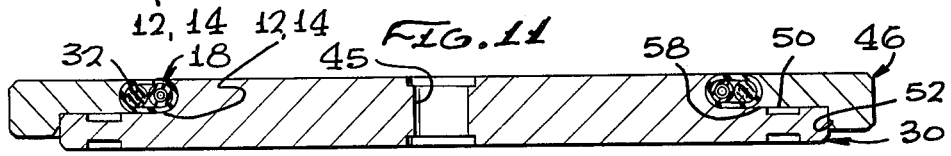

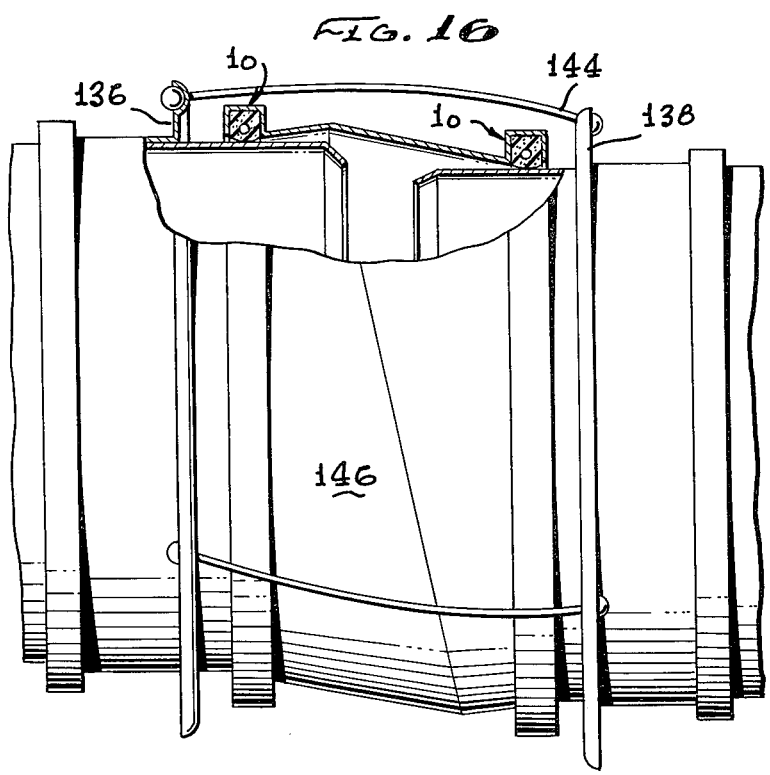
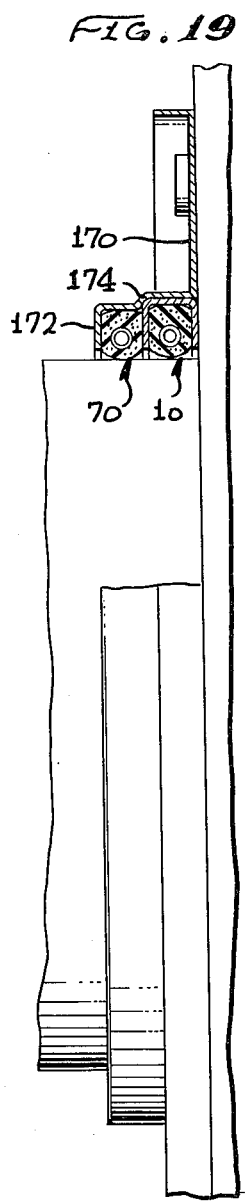
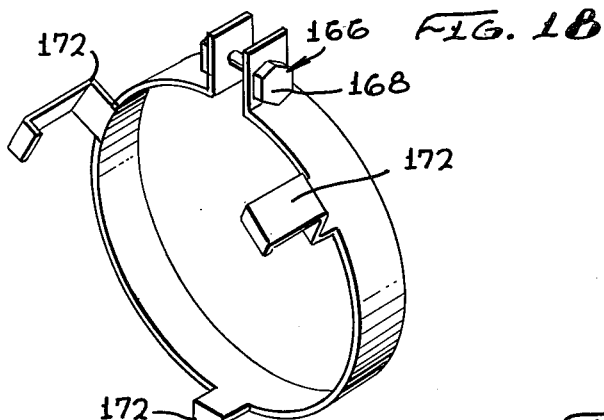
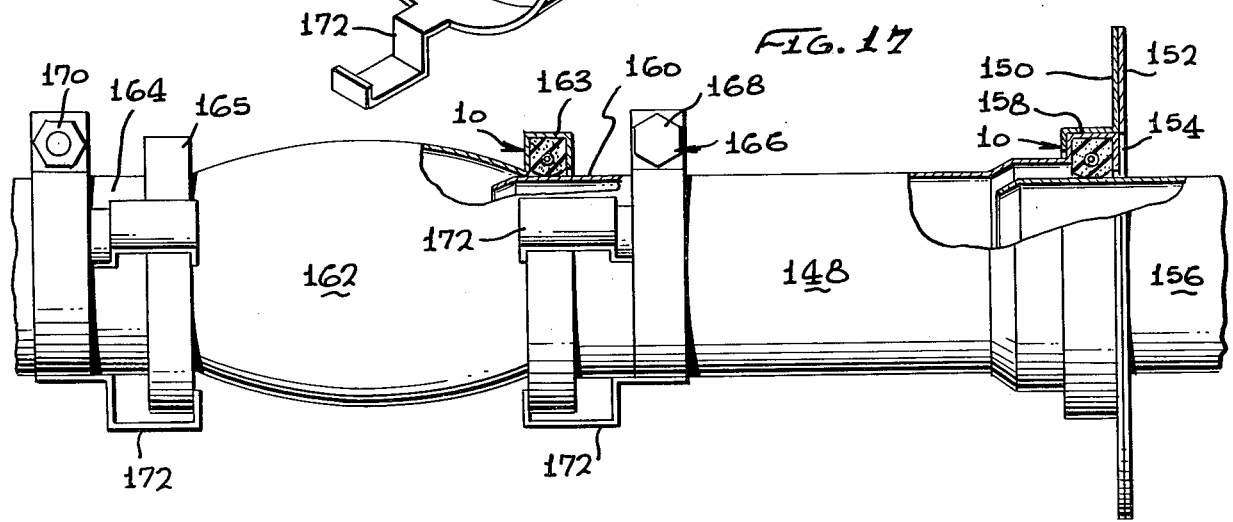

SEAL

This is a continuation in part of patent application Ser. No. 212,028 filed Dec. 2, 1980, and now abandoned, which is a continuation in part of patent application Ser. No. 181,411, filed Aug. 26, 1980 and now abandoned.

This invention relates to a seal, and more particularly to a ring-shaped seal with a centrally disposed garter spring mounted therein.

STATEMENT OF PROBLEM

Rubber seals, particularly those used in aircraft connectors and ducts, tend to leak when cold, due to variations between the thermal coefficients of the material composing the seal and the metal ducts. This leakage tends to increase after a period of use, particularly when the seal is used at elevated temperatures because the rubber forming the seal begins to sets and becomes less elastic.

One way to prevent this leakage is to provide the seal with a garter spring under tension which embraces the seal. With this arrangement, when the seal is on a duct or connector, the spring exerts a exerts a compressive or radially inwardly directed force on the seal. This force compensates for the gradually decreasing resilience of the seal so the seal can still make a sealing engagement with a duct or connector at low temperatures or after the rubber in the seal becomes less resilient, thereby prolonging its useful life.

Elastomeric seals which have a spring under tension mounted therein are typically formed from a silicone impregnated rubber with one or more laminations of silicone impregnated fiberglass cloth molded to and covering at least the surface of the seal which makes a sealing engagement with a surface on a connector or duct. This cloth covering is used becaused it is resistant to abrasion and prolongs the life of the seal, see the U.S. patent to Kramer, No. 3,918,726, and Greenwald, No. 3,698,727.

Heretofore, however, when O-ring type seals of this kind were made, the garter springs pressed against the inner surface of the fiberglass cloth. This is shown in the patent to Greenwald, No. 3,698,727. As a consequence, when the seals were used in aircraft, vibration caused the springs to rub against the inner surface of the fiberglass cloth, wearing it through in a comparatively short time, and destroying the surface that makes a sealing engagement with the work, so that the seal had to be replaced.

Seals in aircraft are often mounted in locations which are hard to get at because they require the disassembly of many aircraft parts in order to reach the seals when the seals have to be replaced. This increases the down-time for the aircraft, which greatly increases the cost of aircraft operation.

It is apparent that if the useful life of seals could be increased, a disproportionately large savings in the cost of the aircraft operation would result.

One way to increase the useful life of rubber seals which have fiberglass cloth covering the work contacting surface of the seal is to prevent the garter spring from rubbing against the inner surface of the fiberglass cloth. If the spring, although under tension, could be held away from the inner surface of the cloth during the molding process, the finished seal would have a thickness of rubber or other suitable elastomeric material between the spring and the inner surface of the fiberglass cloth. This would greatly prolong the useful life of the seal because, before the spring could rub against and through the fiberglass cloth, it would first have to rub through this thickness of rubber. However, it is not easy to insert a garter spring in a rubber seal during the molding process because the rubber in the mold tends to adhere or bond itself to the coils of the spring. If this happens, the coils of the spring become immobilized and the spring cannot exert any compressive force on the seal. To avoid this problem, the spring must be free to move or float inside the seal.

Heretofore, as exemplified by the U.S. patent to Weber, No. 3,406,979, efforts were made to solve the problem of centering a spring inside a seal. However, the Weber Seal, despite its superficial resemblance to the present seal, cannot function the same way as the seal described herein. The reason is the resilience of spring 30 cannot compensate the seal for the decreasing resilience of the rubber because the spring is embedded in the rubber, see Column 3, Lines 45 and 46.

In addition, "flash" forms on the work engaging surfaces of the Weber seal. "Flash" is that part of the elastomeric material which forms at the junction of the molds and in this instance it appears as irregular clumps of rubber. This "flash" must be removed in order to form the sealing surface, but it is time consuming and costly to do this. In addition, the work engaging surface in the Weber seal is not surrounded by fiberglass cloth so it does not have a sufficiently long life.

The U.S. patent to Padula No. 3,603,602 is like the patent to Weber (see FIG. 3) in that the spring is embedded in rubber or elastomeric material. Consequently, it cannot function the same way as a novel seal described herein for the same reasons that were set forth in the discussion of the Weber patent.

The U.S. patent to Wu, No. 4,141,563, also discloses a garter spring embedded in a seal, see FIG. 2 and Column 2, Lines 48 and 49.

The U.S. patent to McQueen No. 3,813,105, discloses a seal having a garter spring 5 embedded or bonded to the seal, see Column 3, Lines 54 and 63.

The U.S. patent to Hubbard, No. 2,535,634 discloses a seal ring for use in centrifugal devices. To enable the seal ring to withstand severe centrifugal forces the seal is provided with a wire reinforcing ring 10. The ring 10 is a circular wire covered with a wire helix 13. The wire helix surrounds the ring 10 making it very rigid but permitting radial expansion under centrifugal force. The helix 3 is covered by a layer of fabric 16, and the fabric is covered by unvulcanized rubber. When the rubber is vulcanized, the wrappings 16 prevent the rubber from flowing into the coils 13.

What is needed, therefore, and comprises and important object of this invention, is to provide a seal formed from an elastomeric material having fiberglass cloth covering at least the work engaging surface of the seal and with a spring under tension movably mounted inside the seal which is held in radially spaced relationship away from the inner surface of the fiberglass cloth.

Another object of this invention is to provide a mold for an elastomeric ring-type seal having a centrally disposed garter spring under tension mounted inside and where the mold is shaped so "flash" does not appear on the work engaging surface of the seal.

A further object of this invention is to provide molds for an elastomeric ring type seal having a centrally disposed garter spring mounted therein which can be stacked so a number of seals can be formed at the same time.

These and other objects of this invention will become more apparent when better understood in the light of the accompanying drawings and specification, wherein:

FIG. 1 is a plan view of the seal constructed according to the principles of this invention.

FIG. 2 is a sectional view taken on the line 2—2 of FIG. 1.

FIG. 3 is an enlarged view of the region surrounded by the circular arrow 3—3 in FIG. 1.

FIG. 4 is an elevational view of the ring-shaped tubular insert with a garter spring inserted therein.

FIG. 5 is a cross-sectional view of the tubular insert with the garter spring in the tubular bore.

FIG. 6 discloses a stack of mold sections used to simultaneously form a number of seals.

FIG. 7 is an exploded view of the mold sections shown in FIG. 8.

FIG. 8 illustrates the first step in the construction of the seal.

FIG. 9 illustrates a second step in the construction of the seal.

FIG. 10 illustrates a third step in the construction of the seal.

FIG. 11 illustrates a fourth step in the construction of the seal.

Figure 12:
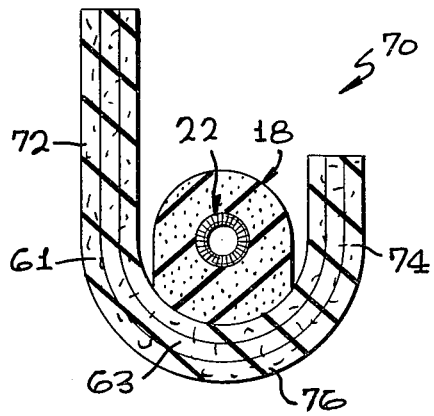

FIG. 12 discloses a ring-shaped seal, J-shaped in cross-section, with an elastomeric insert constructed according to the principles of this invention.

Figure 13:
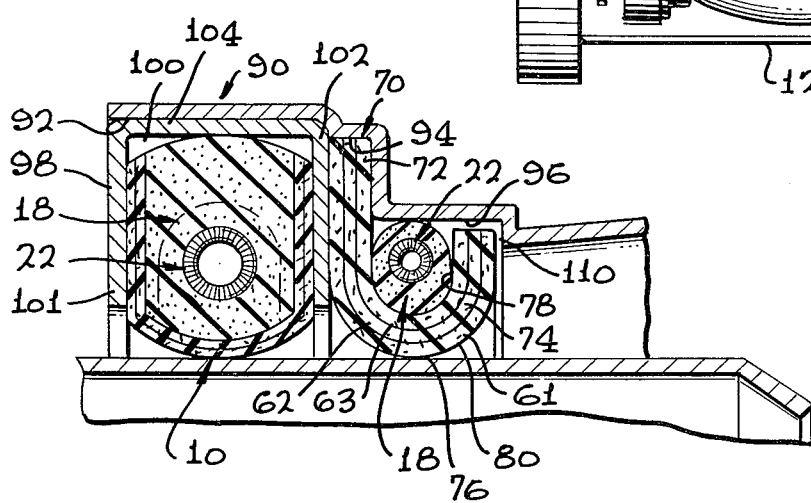

FIG. 13 discloses an enlarged portion of a double seal connector, wherein the inner ring shaped seal is constructed like the seal shown in FIG. 12, and the outer seal is constructed like the seal shown in FIG. 2.

Figure 14:
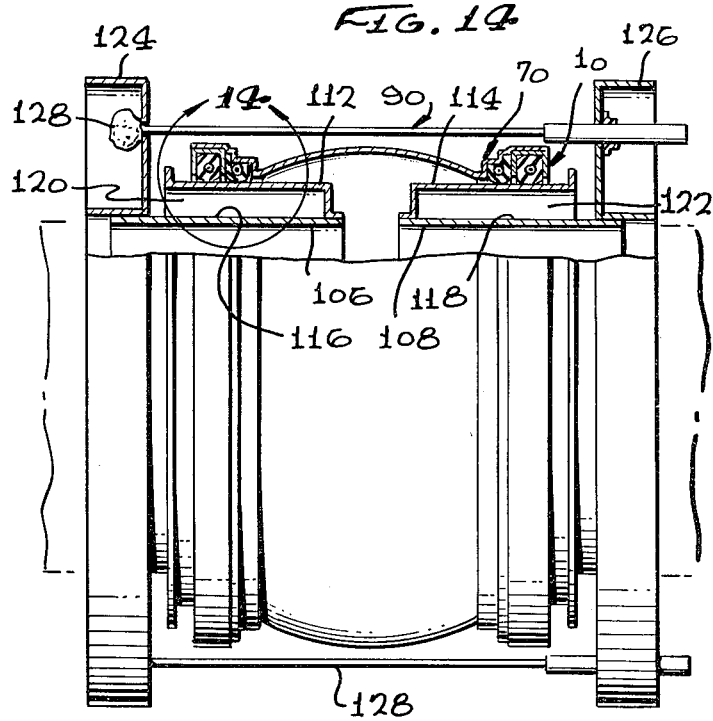

FIG. 14 discloses an aligned double seal restrained connector utilizing the double seal structure shown in FIG. 13.

Figure 15:
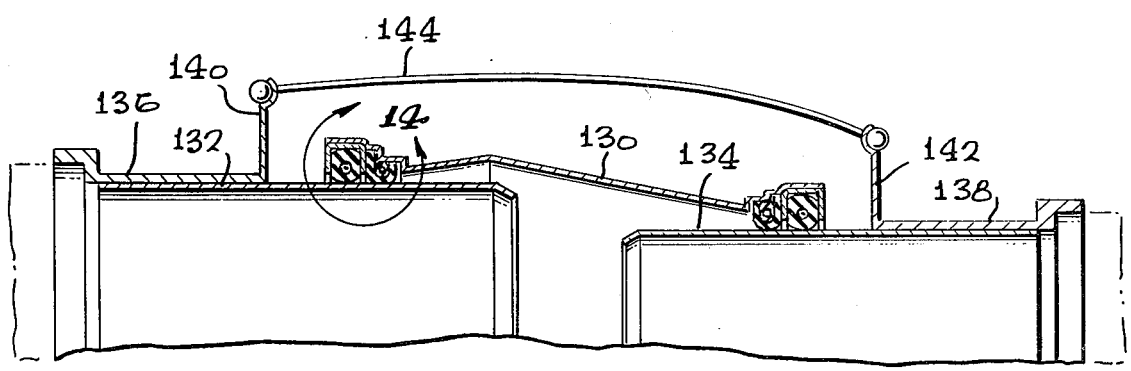

FIG. 15 discloses an offset double seal connector utilizing the double seal structure shown in FIG. 13.

FIG. 16 discloses an offset single seal restrained connector with the seal shown in FIG. 2.

FIG. 17 discloses a conduit arrangement employing a single seal bulkhead connector in combination with restrained connector with the seals shown in FIG. 2.

FIG. 18 is a perspective view of a connector clamp used in combination with the restrained connector of FIG. 18.

FIG. 19 discloses a double seal bulkhead connector wherein the inner seal is shown in FIG. 12 and the outer seal is shown in FIG. 2.

Referring now to FIG. 1 of the drawings, a ring-shaped O-ring type seal indicated generally by the reference numberal 10 is formed from an elastomeric material such as silicone impregnated rubber. Referring to FIG. 2, the seal 10 has a surface 12 which is covered by two layers or laminations of silicon impregnated fiberglass cloth 14 and 16 to form a continuous work engaging surface which is shaped to make a sealing engagement with a surface on a connector or duct. A ring shaped insert 18 comprising an elastomeric tube having a bore 20 and formed from silicone impregnated rubber is inside the seal and a garter or helical ring shaped garter spring 22 is inside the bore.

The tubular insert 18 is formed by a conventional extruding machine and is cut to the desired length with the rubber in a semi-cured state. Next, the garter spring 22 also cut to the desired length is inserted in the bore 20, see FIG. 5. The ends 24 and 26 of the garter spring are shaped so that they can screw into each other to form a ring in a manner well known in the art, see FIG. 3. In this way, after the spring 22 is inserted in the bore 20 in the tubing and the ends of the springs are secured together, the ring shaped insert 18 is produced, see FIG. 4. The term "semi-cured rubber" in this disclosure means that the rubber is cured enough so that when a garter spring is inserted in the bore of the semi-cured tubular insert, and the seal with the insert therein is cured in the mold the garter spring will not be bonded to or adhere to the walls of bore 20 in the insert.

To construct the seal, ring-shaped layers 12 and 14 of fiberglass cloth are inserted in the cavity 28 in mold section 30, see FIG. 8. Then the ring shaped insert 18 with the garter spring in the bore is inserted in the ring shaped mold cavity 28 in mold section 30 over the cloth, see FIG. 9. The diameter of the ring-shaped tubular portions 18 and garter spring 22 in an unstressed condition is smaller than the diameter of the mold cavity. This causes the garter spring 22 in the insert 18 to be under tension when it is mounted in the mold cavity so that it exerts a compressive force on the fiberglass cloth layers 12 and 14 in the mold. This gives the insert 18 with the spring inside, the added function of holding the ring-shaped fiberglass cloth in place in the mold cavity 28 during the molding process.

Next, a preferably ring shaped piece of uncured silicone rubber 32 is inserted in the mold cavity 28, see FIG. 10. After this, the mold cavity 28 is closed off by mold section 46 and by the mold closing surface 58 on mold section 30, or by surface 64 on closure member 60, see FIGS. 7, 8, and 11.

Then, the mold is inserted in an oven long enough to completely cure the rubber. While this is happening, the uncured ring of silicone rubber 32 in mold cavity 28 expands to fill the mold cavity and bonds itself to the insert 18 and to the inner surface of the fiberglass cloth. The silicon rubber bonds itself to the fiberglass cloth easily and strongly because, the fiberglass cloth itself is impregnated with silicon impregnated rubber. Since as stated above the garter spring 22 in the bore of the insert 18 is not bonded to and does not ahere to the walls of the insert, the coils of the spring can contract independently of the rubber of the seal. This is what makes possible the ability of the spring 22 to compensate for the time-related decreasing resilience of the rubber.

As stated above, the semi-cured insert 18 serves as a spacer to hold the garter spring 22 away from the fiberglass cloth during the molding process so that in the finished seal, the spring is held in spaced relationship to the inner surface of the fiberglass cloth, see FIG. 2. It is noted that other kinds elastomeric seals having silicone impregnated fiberglass cloth covering the work engaging surface of the seal and with a spring inside the seal held in spaced relationship to the fiberglass cloth are contemplated within the purview of this invention. This is suggested in the modification shown in FIG. 12.

As seen in FIGS. 2 and 12, in the finished seal the garter spring 22 is held away from the inner surface 40 of the fiberglass layer 16 by the thickness of the tubuler insert 18. Tension in the spring 22 movably mounted or floating inside the bore of the insert in the seal causes the seal to make a sealing engagement with a surface of a metal duct or connector at low temperatures and even after the rubber in the seal has begun to harden. Of course, aircraft vibration will cause the garter spring 22 in the seal to gradually wear away the silicone impregnated rubber between it and the inner surface 40 of the fiberglass layer 16. However, this will take some time and, finally, when the garter spring has worn away enough rubber so it reaches the inner surface 40 of the fiberglass cloth 14, the useful life remaining in the seal would still be about where it is in present seals where the garter spring rubs against the inner surface of the fiberglass cloth from the beginning of its use.

To vary the life of the seal, it would only be necessary to extrude tubular insert 18 with walls which have a different thickness. Alternatively, the composition of the insert and the cloth layers 12 and 14 could be varied to change the ability of the seal to withstand abrasion and rubbing in accordance with special requirements. As will become apparent below, the method of molding the seal described herein is particularly suited for making adjustments in the useful life of the seal, because such adjustments would not involve any important changes in the method of forming the seal.

The molds used in the construction of the seal can be used to form a number of seals at the same time. To do this, a base member 42 is provided. An upright, centrally disposed pole or support member 44 extends up form the base and through support receiving bores 45 formed in the molds.

Each mold is formed in two parts. The first part consists of mold section 30. This section has a generally cylindrical base portion 31 and a centrally disposed cylindrical portion 33 extending up from the base portion. The upwardly extending cylindrical portion is smaller in diameter than the base portion 31, in this particular embodiment, although other configurations where the opposite is true are contemplated. The periphery 35 of the upwardly extending cylindrical portion 33 is generally concave and in this embodiment serves to completely shape the inner surface of the seal which will ultimately engage a sealing surface on a duct or connector. This arrangement is important because the entire inner work contacting surface 11 of the seal 10 is formed from this surface on mold section 30. This prevents the formation of "flash" on surface 11, of the seal, See FIG. 7.

The second part of the mold consists of a ring shaped mold section 46 including a bore 47 and a counter bore 48. Sections 30 and 46 in assembled relation form one complete mold for one seal. In order to assemble mold sections 30 and 46 together, mold section 30 is provided with positioning surfaces 54 and 56 which are disposed on the periphery of a circle, see FIGS. 7 and 11. Surface 54 in addition to functioning as a positioning surface for mold section 46, also serves as the base of the mold cavity, see FIG. 7.

As seen in FIG. 11, mold section 46 rests on mold section 30 and cooperates with it to form the mold cavity. The counter bore 48 of mold section 46 has locating surfaces 50 and 52 which are on the diameter of a circle and bear against surfaces 54 and 56 of the mold section 30 and embrace them to hold the sections 30 and 46 together. In stacked relationship, the lower surface 58 on one mold section 30 rests on the upper surface 59 on mold section 46 and is shaped so it closes the mold cavity 28. See FIG. 6. The periphery 49 of the bore 47 in mold section 46 is, in this embodiment, concave, and completely defines the entire outer work contacting surface 13 of the seal remote from the inner work contacting surface 11, see FIG. 7. Consequently, "flash" cannot form on the outer work contacting surface 13. In assembled relation with mold section 46 resting on mold section 30, the concave surfaces 35 and 49 face each other defining the peripheral limits of the mold cavity 28.

A number of molds, each comprising a mold section 46 and a mold section 30 can be stacked on the upright support 44 so a number of seals can be formed at the same time. A closure member 60 having a centrally disposed support receiving bore 62 is provided for the top of the stack of molds, see FIG. 7. This section has a lower surface 64 which is shaped like surface 58 on mold section 30 and closes off the top mold cavity in the stack of mold sections.

To this point, the principles of this invention have been applied to the ring-shaped O-ring type seal shown in FIG. 1. However, they can also be applied to other kinds of seals as shown in FIG. 12.

Seal 70 shown in FIG. 12 is ring-shaped and is generally channel shaped in cross section with leg portions 72 and 74 and a connecting web portion 76. The seal is formed from multiple laminations of fiberglass cloth impregnated rubber and is designed to be used in a connector such as the connector shown in FIG. 11 of the Greenwald Pat. No. 3,698,727.

In FIG. 13, leg portion 72 of seal 70 bears against the inturned flange or wall 102 in connector 90, while the leg portion 74 is in spaced relation to the inner surface of the connector 90. This type of seal depends on pressure in the duct or connector to deform the laminations of fiberglass cloth and force them into a sealing engagement with surfaces on the connector or duct.

Insert 18 with the garter spring 22 movably mounted in its bore 20 is mounted so it bears against the inner surface 78 of the web or semi-toroidal part 76 of the seal, and is sized so it exerts a compressive force on it. This causes the outer work contacting surface 80 of the web portion 76 seal to make a better sealing engagement with seal engaging surfaces on a duct independent of temperature over a wide temperature range, see FIGS. 12 and 13.

It is apparent that the life of this kind of seal is greatly prolonged in comparison to prior seals of this kind because before spring 22 can reach and rub throught the laminations 61 and 63 of the fiberglass cloth, it first has to rub throught the thickness of the rubber or elastomeric insert 18, which is between the springs and the inner surface 78 of the web portion 76. This arrangement is like the structure shown in FIG. 2 where the spring has to rub through the thickness of the rubber or elastomeric material in the insert which is between the spring 22 and the inner surface 40 of the fiberglass cloth.

If the seals constructed according to the principles of this invention are to be used in a particularly hot environment, in aircraft, where seal failure could have very severe consequences, the connector 90 shown in FIG. 13 is particularly useful. This connector is provided with three counterbores, 92, 94, and 96. In addition, an inwardly open channel shaped divider or seal retaining ring 98 is secured to the counter bore 92 of the end of the connector 90 by welding or any other suitable means.

The ring-shaped seal 10 shown in FIG. 2 is mounted inside the channel 100 defined by the seal retaining ring 98. As seen, the seal is sized so a portion of the seal protrudes beyond the channel 100 for engagement with a seal engaging surface on a duct.

The seal retaining ring 98 includes an outer leg or flange 101, an inner leg of flange 102, and a connecting web portion 104, which is secured by welding or any suitable means to the inner surface of the counterbore 22. The inner leg or flange 102 of the seal retaining ring 98 serves as a divider separating the outer seal 10 from the inner seal 70 and provides an additional fire resistant protective surface.

As seen in FIGS. 13, the base 110 of the counterbored portion 96 is in spaced relation to the inner surface of the leg 74 of seal 70. This is important because it permits non-destructive flexing of the legs 72 and 74 of the seal 70 when the end of the ducts 106 and 108 pivot inside connector 90 (see FIG. 14). Without this arrangement, the inner seal would wear rapidly and failure could occur after a comparatively short time. The double seal connectors shown in FIGS. 13, 14, 15 and 19, provide an additional margin of safety because if te inner seal fails, the outer seal would still prevent the hot gases from escaping.

As a further protection for the seals against very high duct temperatures and pressures, the ducts 106 and 108 shown in FIG. 14 include sleeves 112 and 114 which are secured by welding or any other suitable means to the ends of the ducts. The seal engaging surfaces of these sleeves are in spaced relationship to the outer surface 116 and 118 of the ducts defining an insulating air space 120 and 122 between the surface 116 and 118 of the ducts, and the seals 10 and 70, see FIG. 14. This also greatly extends the life of the seals because the temperature of the seals is thereby lessened, thereby increasing the time it takes for the rubber to begin to set.

The ducts 106 and 108 are provided with ring-shaped radially outwardly extending collars 124 and 126 which embrace their outer surfaces 116 and 118 and are secured thereto by welding or any other suitable means. These collars are channel shaped in cross section as shown in FIG. 14. A number of cables 128, in accordance with the strength required, are connected between the collars in uniformly angularly spaced relationship around the axis of the collars to hold the ducts inside the connector 90 against high pressure gases inside them. The tightness of these cables can be adjusted by any suitable means mounted on the collars.

The seals 10 and 70 used with connector 68 can also be applied to offset connectors 130 as shown in FIG. 15. The offset connectors are used to connect ducts or tubes in aircraft where the axes of these ducts are offset or misaligned from each other. As seen in FIG. 15, the opposite ends of connector 130 are not in alignment witht each other, but they are designed to be aligned with and receive ducts 132 and 134 as shown. The end portions of the offset connector 130 are like that shown in FIG. 14. Cylindrical sleeves 136 and 138 are secured by any suitable means to the outer surface of the ducts and the inner end of the sleeves are bent radially outwardly to define collars 140 and 142. Restraining cables 144 are mounted on these collars in uniformly angularly spaced relationship around the axis of the ducts to hold the ducts inside the connector 130. Any suitable means, not shown can be provided to tighten these cables as reguired.

The offset connector 146 shown in FIG. 16 is like that shown in FIG. 15, except that it employs a single seal 10 at each end instead of the double seal arrangement shown in FIG. 16.

Aircraft have many bulkheads through which ducts must pass. These often require the use of a bulkhead connector. As shown in FIG. 17, the single seal bulkhead connector 148 is provided with a radially outwardly extending mounting flange 150 at one end and secured by any suitable means to the outer surface of the inner end of the bulkhead connector. This mounting flange is secured to bulkhead 152 by any suitable means. The bulkhead 152 is provided with a bore 154 sized to permit a duct 156 to pass through. The inner end of the bulkhead connector 148 is sized to permit the entry of the duct. The bulkhead connector is provided with a radially inwardly open seal receiving channel 158 at its inner end. Seal 10 is mounted therein and is sized so it is in sealing engagement with the outer surface of the duct 156.

The opposite end 160 of the bulkhead connector extends inside one end of of a connector 162. This connector is provided with rib-like radially outwardly extending inwardly open seal receiving channels 163 and 165 at each end in which the seals 10 are mounted. Another duct, 164, is mounted in the opposite end of the connector 162.

In order to hold the duct 164 and the end of the other end of the bulkhead connector 148 inside the connector 162 against the high pressure of the gases therein, a generally cylindrical split clamp ring 166 is mounted on the outer surfaces of the bulkhead connector 148 and the duct 164 and tightened thereon by bolt 168 and nut 170 shown in FIG. 18. The clamp ring 166 is provided with three integrally attached claws 172 disposed in uniformly angularly spaced relationship around the periphery of the clamp ring. These claws fit over the radially outwardly extending heat radiating surface of the seal retaining channels 163 and 165 as shown in FIG. 17. In this way, when the clamp rings are tightened on duct 164 and the bulkhead connector 198, with the claws 172 extending over the outer surface of the rib-like seal receiving channels 163 and 165, the bulkhead connector 184 and the duct 164 are held securely inside connector 162.

In some circumstances where special conditions of high temperature and aircraft vibrations require it, the bulkhead connector 170 shown in FIG. 19 may be used. This connector is provided with inner and outer seals 70 and 10 mounted in the seal ring receiving channels 172 and 174. This portion of the double seal bulkhead connector would be shaped like the portion of the connector shown in FIG. 13.

Having shown and described the invention, what I claim is new is:

1. A ring-shaped seal of the class described, said seal having an inner surface, said inner surface formed from an elstomer impregnated fabric and comprising a work-engaging surface adapted to make a sealing engagement with a surface on a duct, said seal further including a generally tubular ring-shaped insert mounted on the seal so it engages the surface of said fabric opposite said work-engaging surface, said insert being formed from a resilient material, a ring-shaped spring movably mounted inside the bore of said tubular ring-shaped insert with the spring surrounded by and engaging the inner walls of the tubular insert, and in such a way that the coils of the spring are not bonded to and do not adhere to the walls of the bore of the tubular insert, and so the walls of the tubular insert are between the spring and the said opposite surface of said elstomer impregnated fabric to hold said spring away from said fabric to prolong the life of the seal, and said spring sized so that when the seal is in work-engaging contact with a duct, said spring maintains the seal in sealing engagement with a surface on the duct, independent of temperature, over a wide temperature range to compensate the seal for the decreasing resilience of elastomeric material in the seal.

2. The seal described in claim 1 where the seal is generally circular in cross-section and formed from an elastomer.

3. The deal described in claim 1 wherein said inner surface is formed from at least one lamination of an elastomer impregnated fabric.

* * * * *